United States Patent [19]
Dudley et al.

[11] Patent Number: 5,583,706
[45] Date of Patent: Dec. 10, 1996

[54] DECIMATION DC OFFSET CONTROL IN A SAMPLED AMPLITUDE READ CHANNEL

[75] Inventors: Trent O. Dudley, Littleton; William G. Gliss, Thornton; Richard T. Behems, Louisville, all of Colo.; David R. Welland, Austin, Tex.

[73] Assignee: Cirrus Logic, Inc., Fremont, Calif.

[21] Appl. No.: 341,723

[22] Filed: Nov. 17, 1994

[51] Int. Cl.$^6$ .................................................. G11B 5/09
[52] U.S. Cl. .................................. 360/46; 360/51; 360/65
[58] Field of Search .................................. 360/46, 65, 51

[56] References Cited

U.S. PATENT DOCUMENTS

| | | | |
|---|---|---|---|
| 3,819,864 | 6/1974 | Carroll et al. | 179/15 BL |
| 5,331,583 | 7/1994 | Hara et al. | 364/724.01 |
| 5,341,249 | 8/1994 | Abbot et al. | 360/46 |
| 5,459,679 | 10/1995 | Ziperovich | 364/602 |

OTHER PUBLICATIONS

Schmerback, Richetta, Smith, "A27Mhz Mixed Analog/Digital Magnetic Recording Channel DSP Using Partial Response Signaling with Maximum Likelihood Dectection", *IEEE International Solid-State Circuits Conference*, pp. 136–137, 1991.

Cideciyan, Dolivo, Hermann, Hirt, Schott, "A PRML System for Digital Magnetic Recording", *IEEE Journal on Selected Areas in Communication* vol. 10, No. 1, pp. 38–56, Jan. 1992.

*Primary Examiner*—W. Chris Kim
*Attorney, Agent, or Firm*—Howard S. Sheerin

[57] ABSTRACT

In a sampled amplitude read channel for magnetic recording, a nonlinear discrete time decimation filter in a negative feed back loop adjusts a DC offset in an analog read signal from a magnetic read head without distorting the read signal. In sampled amplitude recording, adding the samples of an isolated positive pulse to the samples of an isolated negative pulse generates the DC offset of the discrete time sample values. A decimation filter adds the sample values from a positive pulse to the sample values of a negative pulse in order to detect and pass the DC offset in the read signal. The detected discrete time DC offset from the discrete time decimation filter is converted into an analog DC offset signal and subtracted from the analog read signal in a negative feedback loop. A running average decimation filter removes the DC offset during acquisition, and a decision-directed decimation filter removes the DC offset during tracking.

14 Claims, 7 Drawing Sheets

DECIMATION DC OFFSET CONTROL IN A SAMPLED AMPLITUDE READ CHANNEL

CROSS REFERENCE TO RELATED APPLICATIONS AND PATENTS

This application is related to other co-pending U.S. patent applications, namely application Ser. No. 08/440,515 entitled "Sampled Amplitude Read Channel Comprising Sample Estimation Equalization, Defect Scanning, Channel Quality, Digital Servo Demodulation, PID Filter for Timing Recovery, and DC Offset Control," 08/01,266 entitled "Synchronous Read Channel," 08/236,719 entitled "Method and Apparatus for Calibrating a PRML Read Channel Integrated Circuit," and 08/313,491 entitled "Improved Timing Recovery For Synchronous Partial Response Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," and U.S. Pat. No. 5,329,554 entitled "Digital Pulse Detector." All of the above-named patent applications and patents are assigned to the same entity, and all are incorporated herein by reference.

FIELD OF INVENTION

The present invention relates to the control of magnetic storage systems for digital computers, and particularly to a sampled amplitude read channel that employs decimation DC offset control.

BACKGROUND OF THE INVENTION

In magnetic storage systems for computers, digital data serves to modulate the current in a read/write head coil so that a sequence of corresponding magnetic flux transitions are written onto a magnetic medium in concentric tracks. When reading this recorded data, the read/write head again passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to noise. As a result, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, threshold crossing or derivative information, implemented in analog circuitry, is normally used to detect peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

Detection errors are also caused by intersymbol interference (ISI). Storage density is directly related to the number of pulses stored on the storage medium, and as the pulses are packed closer together in the effort to increase data density, they eventually interfere with each other resulting in intersymbol interference. This interference can cause a peak to shift out of its bit cell, or its magnitude to decrease, and result in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL a (1,7) 2/3 rate code encodes 8 bit data words into 12 bit codewords to satisfy the (1,7) constraint.

Sampled amplitude detection, such as partial response (PR) with Viterbi detection, allows for increased data density by compensating for intersymbol interference and increasing channel noise immunity. Unlike conventional peak detection systems, sampled amplitude recording detects digital data by interpreting, at discrete time instances, the actual value of the pulse data. A sampling device samples the analog read signal at the band rate (code bit rate) and an equalizing filter equalizes the sample values according to a desired partial response. A discrete time sequence detector, such as a Viterbi detector, interprets the equalized sample values in context to determine a most likely sequence for the data (i.e., maximum likelihood sequence detection MLSD). In this manner, the effect of ISI and channel noise can be taken into account during the detection process, thereby decreasing the probability of a detection error. After processing a consecutive sequence of sample values, the sequence detector compensates for ISI by selecting the most likely digital sequence associated with the sample values. This increases the signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp. 921–934, Sep. 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp. 38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, Nov. 1991; and Carley et al, "Adaptive Continuous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, Sep. 1994; and Abbott et al, "Timing Recovery For Adaptive Decision Feedback Equalization of The Magnetic Storage Channel", *Globecom'90 IEEE Global Telecommunications Conference* 1990, San Diego, Calif., Nov. 1990, pp. 1794–1799; and Abbott et al, "Performance of Digital Magnetic Recording with Equalization and Offtrack Interference", *IEEE Transactions on Magnetics*, Vol. 27, No. 1, Jan. 1991; and Cioffi et al, "Adaptive Equalization in Magnetic-Disk Storage Channels", *IEEE Communication Magazine*, Feb. 1990; and Roger Wood, "Enhanced Decision Feedback Equalization", *Intermag'90*.

Timing Recovery

Similar to conventional peak detection systems, sampled amplitude detection requires timing recovery in order to correctly extract the digital sequence. Rather than process the continuous signal to align peaks to the center of bit cell periods, as in peak detection systems, sampled amplitude systems synchronize the sampling of the pulses. That is, timing recovery adjusts the sampling clock in order to minimize the error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

Normally, a phase-locked-loop (PLL) circuit controls the timing recovery in sampled amplitude detection. A phase detector generates a phase error based on the difference between the estimated samples and the read signal samples. A loop filter filters the phase error, and the filtered phase error operates to adjust the sampling clock which is typically the output of a variable frequency oscillator (VFO) with the filtered phase error as the control input. The output of the VFO controls the sampling clock of a sampling device such as an analog-to-digital (A/D) converter.

It is helpful to first lock the PLL to a reference or nominal sampling frequency so that the desired sampling frequency, with respect to the analog pulses representing the digital data, can be acquired and tracked more efficiently. The nominal sampling frequency is the baud rate, the rate that data was written onto the medium. Therefore, one method to lock-to-reference is to generate a sinusoidal signal relative to the write clock and inject this signal into the PLL. Once locked to the reference frequency, the PLL input switches from the write clock to the signal from the read head in order to synchronize the sampling of the waveform in response to a sinusoidal acquisition preamble recorded on the medium.

The acquisition and tracking modes for timing recovery are related to the data format of the magnetic disk. FIG. 2A shows a magnetic disk comprising a plurality of concentric data tracks 13 wherein each data track 13 is comprised of a plurality of sectors 15. Servo fields 17 are embedded into the sectors 15 and used to control and verify the track and sector position of the read/write head. FIG. 2B shows the format of a sector 15 comprising an acquisition preamble, a sync mark, and user data. The acquisition preamble is a predetermined sequence that allows timing recovery to acquire the desired sampling phase and frequency before reading the user data. After acquisition, the PLL switches to a tracking mode in order to track the desired sampling phase and frequency with respect to the analog pulses representing the user data. The sync mark signals the beginning of the user data. As illustrated in FIG. 2B, a short acquisition preamble is desirable to allow more storage area for user data.

Prior techniques are known for acquiring and tracking the sampling frequency/phase based on the phase error (herein also referred to as timing gradient or stochastic gradient) computed from the actual signal samples and estimated signal samples obtained from symbol-by-symbol decisions. See "Timing Recovery in Digital Synchronous Receivers" by K. H. Mueller and M. Muller, IEEE Transactions on Communications, Vol. Com-24 (1976), pp. 516–531. Copending U.S. patent application Ser. No. 08/313,491 entitled "Improved Timing Recovery for Synchronous Partial Response Recording" discloses an improvement to the Mueller and Muller stochastic gradient method. In this method of timing recovery a slicer, commonly employed in a d=0 PR4 partial response recording channel, estimates the sample values by comparing the signal sample values to predetermined thresholds. A stochastic gradient circuit, which minimizes the mean squared error between the signal sample values and the estimated sample values, generates the phase error to control the sampling clock.

U.S. Pat. No. 5,359,631 entitled "Timing Recovery Circuit for Synchronous Waveform Sampling" discloses yet another method for timing recovery in a sampled amplitude read channel. In this method a pulse detector, commonly employed in a d=1 EPR4 or EEPR4 partial response recording channel, operates to determine the estimated sample values. Again, a stochastic gradient circuit uses the estimated sample values, together with the signal sample values, to generate the phase error for adjusting the sampling clock in the decision-directed feedback system.

Gain Control

Sampled amplitude read channels employ a decision-directed feedback system for controlling the gain of the analog read signal. Rather than adjusting the gain of the read signal so that peaks are accurately detected, as in analog peak detection channels, sampled amplitude channels synchronize the sampling of the pulses. That is, gain control adjusts the gain of the read signal in order to minimize the error between the signal sample values and estimated sample values. A pulse detector or slicer determines the estimated sample values from the read signal samples. Even in the presence of ISI the sample values can be estimated and, together with the signal sample values, used to adjust the gain of the read signal in order to synchronize the sampling of the analog pulses in a decision-directed feedback system.

Normally, a variable gain amplifier adjusts the gain of the read signal in sampled amplitude recording. A stochastic gradient circuit processes the estimated samples and the read signal samples to generate a gain error between the actual and estimated sample values. A loop filter filters the gain error, and the filtered gain error operates to adjust the output of the variable gain amplifier.

Techniques similar to those used for timing recovery are known to be useful in automatic control of signal gain in the sampling of a signal waveform. See Roy D. Cideciyan, Francois Dolivo, Walter Hirt, and Wolfgang Schott, "A PRML System for Digital Magnetic Recording", IEEE Journal on Selected Areas in Communications, Vol. 10 No. 1, January 1992, pp. 38–56, which discloses the Mueller and Muller stochastic gradient method for gain control. In this method a slicer, commonly employed in a d=0 PR4 partial response recording channel, estimates the sample values by comparing the signal sample values to predetermined thresholds. A stochastic gradient circuit, which minimizes the mean squared error between the signal sample values and the estimated sample values, generates the gain error to control the output of the variable gain amplifier.

U.S. Pat. No. 5,297,184, entitled "Gain Control Circuit for Synchronous Waveform Sampling", discusses another method for gain control in a sampled amplitude read channel. This method uses a pulse detector, commonly employed in a d=1 EPR4 or EEPR4 partial response recording channel, to determine the estimated sample values. Again, a stochastic gradient circuit uses the estimated sample values, together with the signal sample values, to generate the gain error for adjusting the gain of the read signal in the decision-directed feedback system.

DC Offset Control

The automatic gain and timing control circuitry of a sampled amplitude read channel are adversely affected by a DC offset in the analog read signal. Gain and timing control attempt to adjust the amplitude and sampling of the analog read signal, respectively, so that the read signal sample values match estimated sample values. For instance, in PR4 recording the estimated sample values are +2, 0, and −2. A sample value estimator, such as a slicer or pulse detector, determines the estimated sample values from the read signal sample values. A DC offset in the analog read signal accentuates errors between the read signal sample values and the estimated sample values, thereby degrading the performance of gain control. Further, a DC offset can cause errors in determining the estimated sample values, thereby degrading the performance of both gain and timing control. The adverse effect of a DC offset on gain and timing control can propagate through to the discrete time sequence detector causing detection errors.

A DC offset in the analog read signal may also reduce the effective range of the sampling device, such as an A/D converter. That is, the sampling device's "head room" in its range is reduced in the direction of the DC offset. A large enough DC offset will cause clipping in the read signal sample values.

A method for reducing the DC offset in the analog read signal is disclosed in co-pending U.S. patent application Ser. No. 08/333,488 entitled "Read Channel Having Auto-Zeroing and Offset Compensation, and Power-Down Between Servo Fields." As taught in that application, a linear discrete time low pass filter, responsive to the discrete time sample values, detects a DC offset in the sample values. The detected discrete time DC offset is converted into an analog DC offset signal that is subtracted from the analog read signal in a negative feedback loop. The problem with this method, however, is that a linear low pass filter detects and passes frequencies other than the DC offset. This is true even in an ideal recording system where the analog pulses of opposite polarity are completely symmetric except for a DC offset. In other words, if the discrete time sample values of an analog read signal attain the target characteristics except for a DC offset, then a linear digital low pass filter in a negative feedback loop cannot remove the DC offset without distorting the read signal.

It is a general object of the present invention to adjust a DC offset in an analog read signal from a magnetic read head without distorting the read signal in order to improve the accuracy of the read channel and prevent clipping in the sampling device.

SUMMARY OF THE INVENTION

The objects of the present invention are achieved by incorporating into a sampled amplitude read channel a nonlinear discrete time decimation filter in a negative feed back loop capable of adjusting a DC offset in an analog read signal from a magnetic read head without distorting the read signal. In sampled amplitude recording, adding the samples of an isolated positive pulse to the samples of an isolated negative pulse can generate the DC offset component of the signal. A decimation filter adds the sample values from a positive pulse to the sample values of a negative pulse in order to detect and pass the DC offset without distorting the read signal. The detected discrete time DC offset from the discrete time decimation filter is converted into an analog DC offset signal and subtracted from the analog read signal in a negative feedback loop. In the preferred embodiment, a running average decimation filter adjusts the DC offset during acquisition, and a decision-directed decimation filter adjusts the DC offset during tracking.

During acquisition, the analog read signal is a repeating predetermined pattern of polarity alternating pulses. Therefore, a running average decimation filter can detect the DC offset in the acquisition read signal by adding a predetermined number of sample values spanning a positive and negative pulse. The running average decimation filter is necessary during acquisition because the initial gain and offset of the analog read signal may degrade the operation of a decision-directed decimation filter used for tracking. That is, a decision-directed decimation filter will not function correctly until the gain of the analog read signal is sufficiently high to trigger decisions and the DC offset is sufficiently small to detect positive and negative pulses.

During tracking mode, a running average decimation filter cannot detect and pass the DC offset because the positive and negative pulses do not occur in a predetermined pattern. Therefore, when the sampled amplitude read channel switches into tracking mode, the DC offset control switches from the running average decimation filter to a decision-directed decimation filter. Similar to the running average decimation filter, a decision-directed decimation filter detects and passes only the DC offset in the read signal by adding the samples of a positive pulse to the samples of a negative pulse. Rather than adding a predetermined number of sample values, however, a decision-directed decimation filter adds a variable number of sample values of consecutive pulses. A decision is made based on the sample values to determine when consecutive pulses occur, i.e., decision-directed decimation filter.

BRIEF DESCRIPTION OF THE DRAWINGS

The above and other aspects and advantages of the present invention will be better understood by reading the following detailed description of the invention in conjunction with the drawings wherein.

DETAILED DESCRIPTION OF THE PREFERRED EMBODIMENT

Sampled Amplitude Recording Channel

Figure 1:
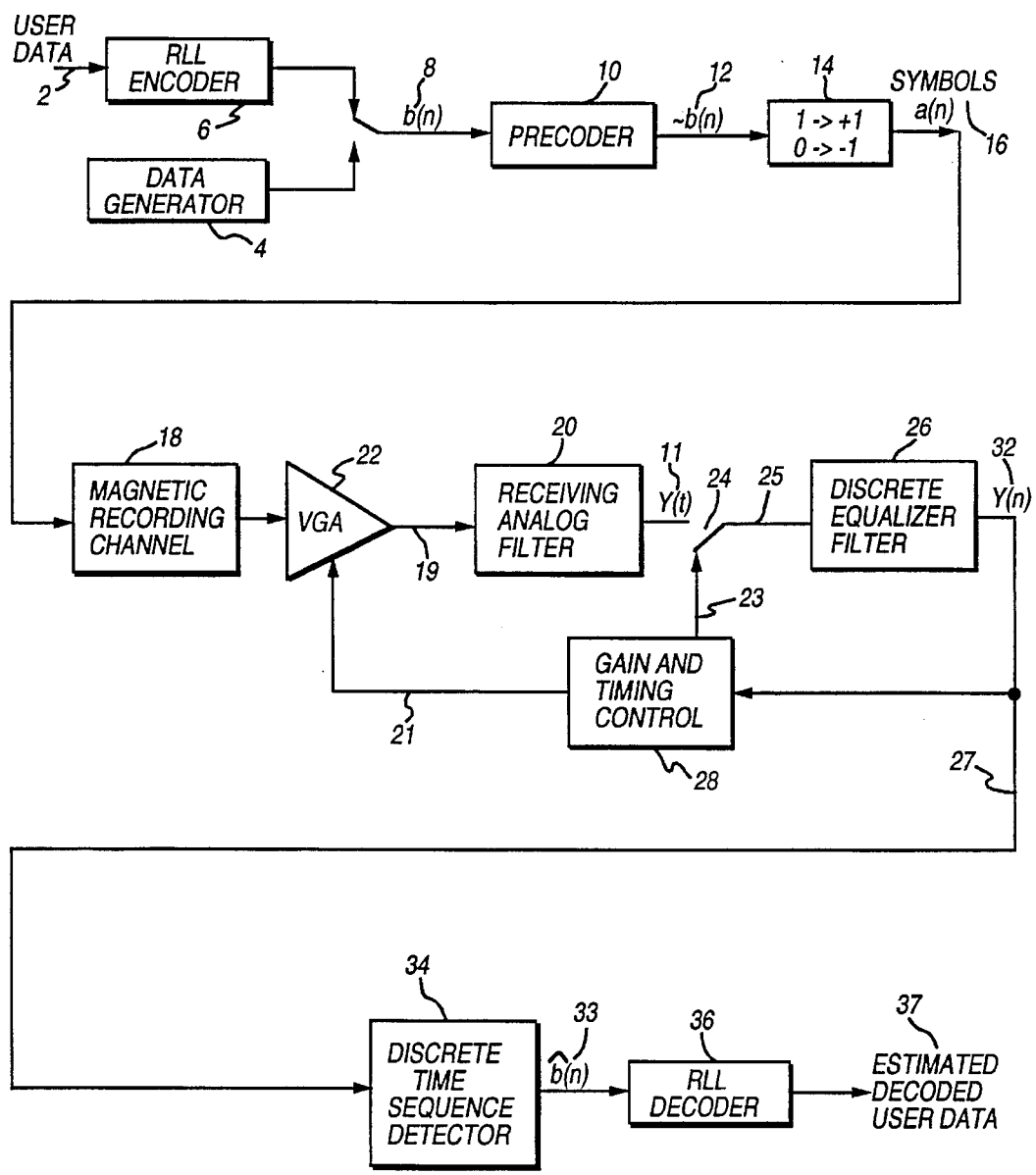
FIG. 1 is a block diagram of a conventional sampled amplitude recording channel.

FIG. 1 is a detailed block diagram of a conventional sampled amplitude read/write recording channel. During a write operation, either user data 2 or preamble data from a data generator 4 (for example 2T preamble data) is written onto the media. A RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N) =+1. The symbols a(n) 16 modulate the current in the recording head coil at the baud rate 1/T to record the binary sequence onto the magnetic media.

When reading the binary sequence back, a variable gain amplifier 22 adjusts the amplitude of the analog read signal 19, and an analog filter 20 provides initial equalization toward the desired response. A sampling device 24 samples the analog read signal Y(t) 11 from the analog filter 20, and a discrete time filter 26 provides further equalization toward the desired response. In partial response recording, for example, the desired response is often selected from Table 1.

The equalized sample values 32 are applied over line 27 to decision-directed gain and timing control 28 for adjusting the amplitude of the read signal and the frequency and phase of the sampling device 24, respectively. Timing recovery adjusts the frequency of sampling device 24 over line 23 in order to synchronize the equalized samples 32 to the waveform (see co-pending U.S. patent application Ser. No. 08/313,491 entitled "Improved Timing Recovery For Synchronous Partial Response Recording"). Gain control adjusts the gain of variable gain amplifier 22 over line 21. The equalized samples Y(n) 32 are sent to a discrete time sequence detector 34, such as a maximum likelihood (ML) Viterbi sequence detector, to detect an estimated binary sequence ^b(n) 33. An RLL decoder 36 decodes the estimated binary sequence ^b(n) 33 into estimated user data 37. In the absence of errors, the estimated binary sequence ^b(n) 33 is equal to the recorded binary sequence b(n) 8, and the decoded user data 37 is equal to the recorded user data 2.

Data Format

Figure 2A:
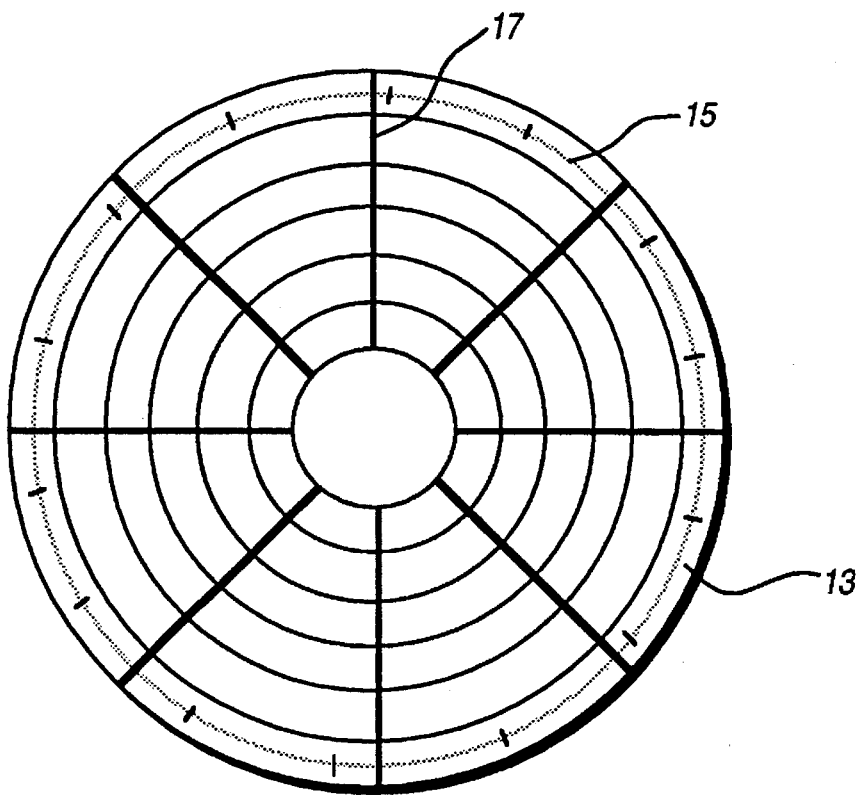
FIG. 2A shows an exemplary data format of a magnetic disk having a plurality of concentric tracks where each track contains a plurality of sectors.
Figure 2B:
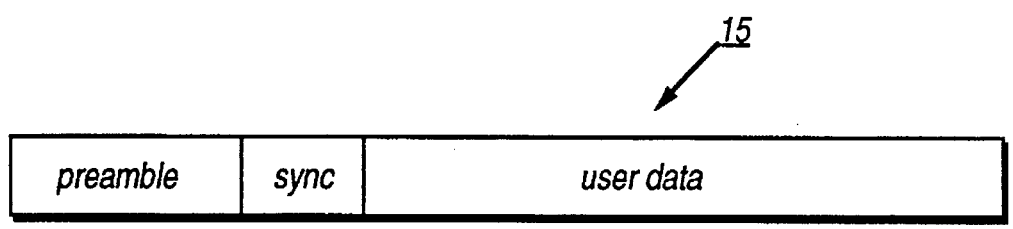
FIG. 2B shows an exemplary format of a sector.

FIG. 2A shows an exemplary data format of a magnetic media comprising a plurality of concentric data tracks 13 wherein each data track 13 is comprised of a plurality of sectors 15, and wherein a plurality of servo fields 17 are embedded in the sectors. The servo fields 17 are processed to verify the track and sector position of the read/write head. Additionally, servo bursts within the servo field 17 are processed to keep the head aligned over the desired track 13 while writing and reading data. FIG. 2B shows the format of a sector 15 comprising a acquisition preamble, a sync mark, and user data. Timing recovery uses the acquisition preamble to acquire the correct sampling frequency and phase, and the sync mark signals the beginning of user data. See co-pending U.S. patent application Ser. No. 08/313,491 entitled "Improved Timing Recovery For Synchronous Partial Response Recording".

Sampled Amplitude Read Channel With Decimation DC Offset

In magnetic recording storage devices, magnetic flux changes are indicative of the recording of a "1" bit. Each magnetic flux change will induce a current through the magnetic read head, and the direction of the current alternates with each flux change. Therefore, there is a constraint that the read head will generate exactly one negative pulse between each pair of positive pulses. The sum of the samples of an isolated positive pulse with the samples of an isolated negative pulse will equal zero if there is no DC offset in the sample values 25.

Figure 3:
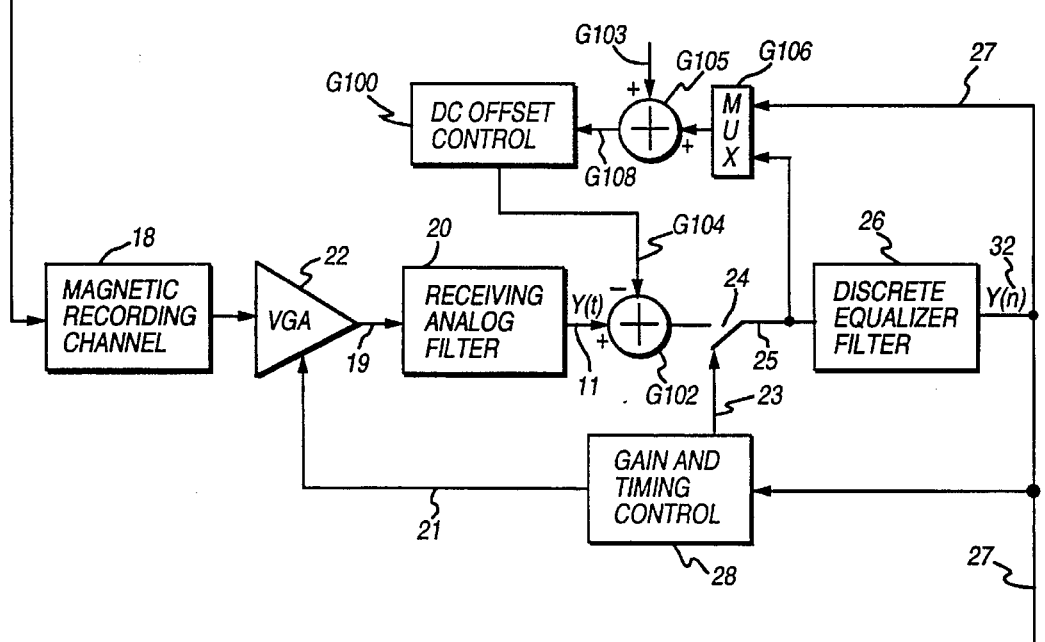
FIG. 3 is a block diagram of a sampled amplitude recording channel incorporating the DC offset control of the present invention.

FIG. 3 shows a sampled amplitude read channel incorporating the decimation DC offset control of the present invention. An analog adder G102 subtracts an analog DC offset signal G104 from the analog read signal Y(t) 11 before sampling device 24 samples the analog read signal. A decimation DC offset controller G100 generates an analog DC offset signal G104 from the sequence of discrete time sample values G108. The sample values are selected from the output of the sampling device 24 or the output of the discrete time equalizing filter 26 through multiplexor G106. The sample values from sampling device 24 are normally used during acquisition in order to avoid the delay of the equalizing filter 26. This allows a higher gain in the DC offset loop so that the preamble can be quickly acquired. During tracking, however, the bandwidth and associated gain are decreased to reduce sensitivity to noise in the read signal. This allows the DC offset controller G100 to optionally use the output of the equalizing filter 26 during tracking if the equalized samples improve the DC offset computation. The output of multiplexor G106 is input into an adder G105 in order to add a DC offset correction value G103 to the sample values. Adding a correction value G103 to the read signal may be necessary to compensate for asymmetric pulses or to adjust the analog signal to better fit the range of the sampling device 24.

Figure 4:
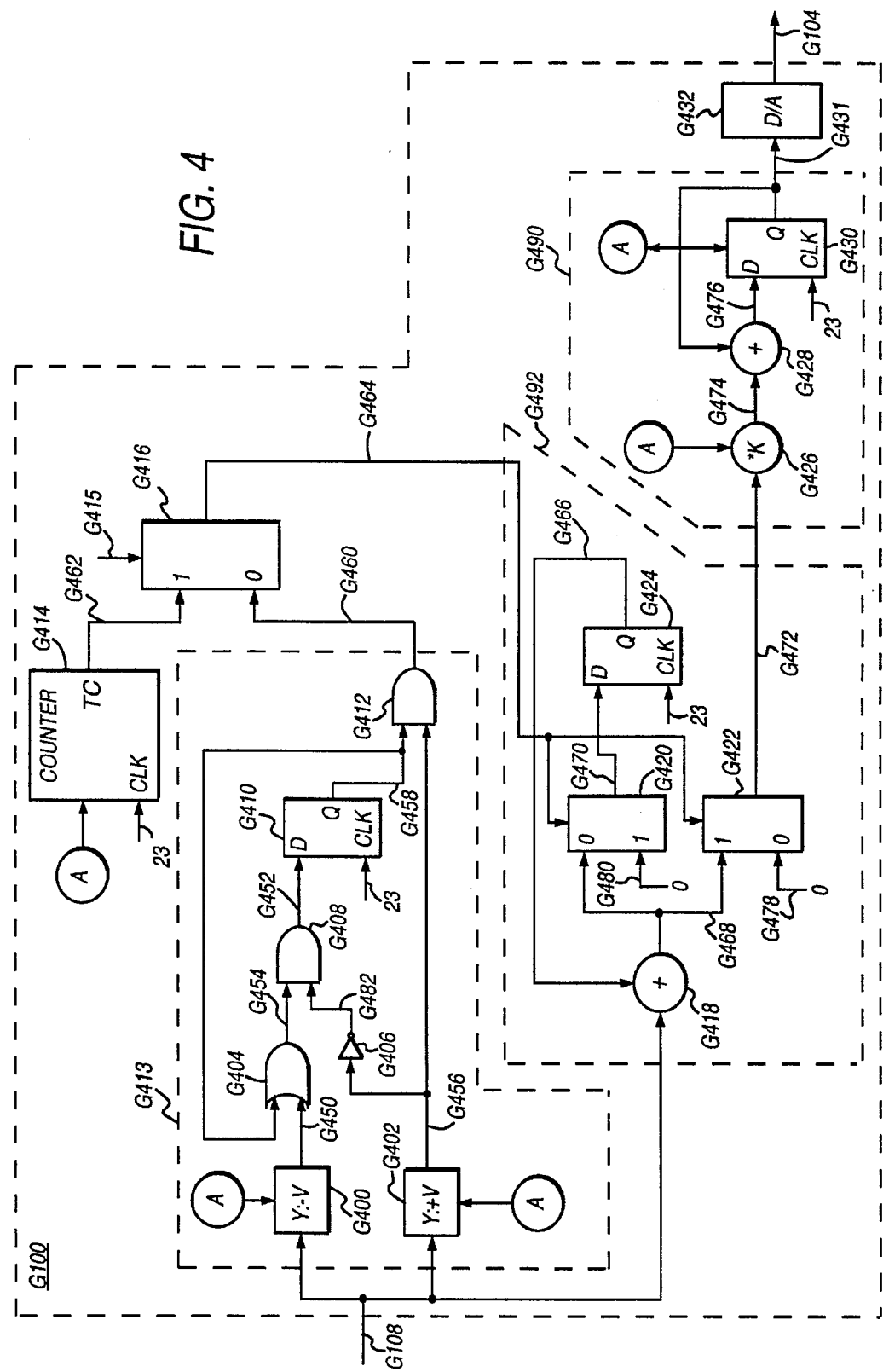
FIG. 4 is a more detailed logic circuit diagram of the DC offset control.

Referring now to FIG. 4, the decimation DC offset controller G100 comprises a discrete time running average decimation filter {G414, G492} used during acquisition, and a discrete time decision-directed decimation filter {G413, G492} used during tracking. The decimation filters generate a discrete time DC offset signal at line G472. An accumulation circuit G490 integrates the DC offset signal G472 to attenuate noise associated with the DC offset signal. The output of the accumulation circuit G490 is applied over line G431 to a discrete time to analog converter G432, the output of which is the analog DC offset signal G104 subtracted from the analog read signal at adder G102 of FIG. 3.

FIGS. 5A through 6B illustrate the operation of the DC offset controller G100 with respect to the analog read signal 11 in acquisition and tracking mode. In the graphs of FIGS.

5A through 6B, time increments from the left to the right. The line labeled "0" is indexed with "tick" marks corresponding to the times of the discrete samples acquired by operation of discrete sampling device 24 of FIG. 3. The left most tick mark on the line is labelled t0. Subsequent tick marks are labelled for times t1, t2, t3, etc. The waveform plotted over the graph represents the amplitude of the analog read signal 11. The line labelled "0" represents a normalized amplitude of zero for normalized analog signal 11. The lines labelled "+1" and "−1" represent the analog signal's normalized amplitude of +1 and −1, respectively. At each discrete time, t0 . . . tn, discrete sampling device 24 acquires a discrete time sample of the continuous analog signal 11. Each labelled point on the graph represents a discrete time sample value corresponding to one of the discrete time tick marks, t0 . . . tn.

Figure 5A:
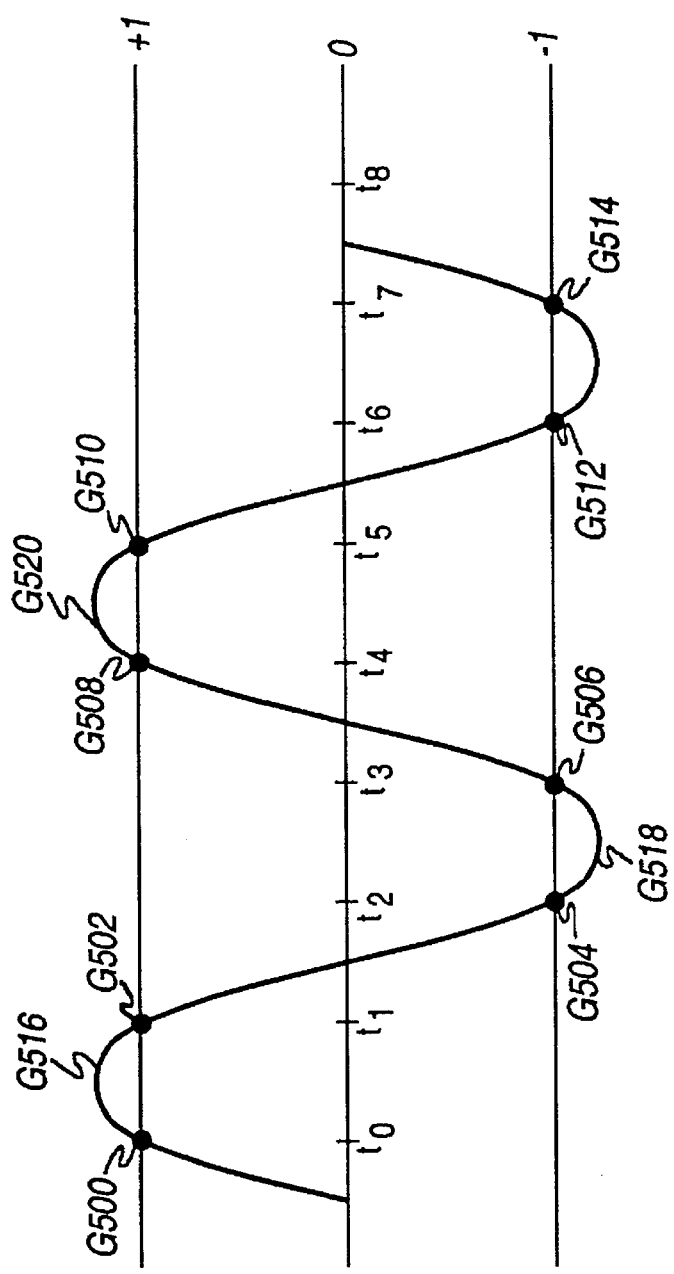
FIG. 5A and 5B show a sampled read signal and associated timing of DC offset control during acquisition.
Figure 5B:
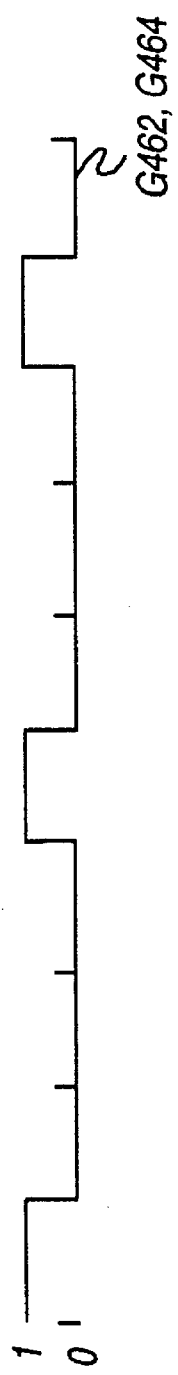

FIG. 5 depicts an example acquisition waveform having alternating positive and negative pulses. This sinusoidal waveform is typically used for acquisition in a d=0 PR4 read channel to enable rapid adjustments to the timing and gain before reading the data field. Although the example acquisition waveform shown in FIG. 5A is sinusoidal due to adjacent positive and negative pulses, other acquisition preambles can be used with the DC offset control of the present invention. For instance, the alternating pulses may be spread further apart rather than adjacent. All that is necessary for the DC offset controller of the present invention to operate as intended is an acquisition preamble that generates a known pattern of pulses.

In acquisition mode, a predetermined number of samples, such as four samples in a 2T preamble, are summed to detect the DC offset. A fixed number of samples may be summed because of the predictable, repeated pulse pattern read from the magnetic medium in acquisition mode. For the 2T preamble shown in FIG. 5A, four discrete time samples are accumulated G500, G502, G504, and G506. When these discrete time sample values are added together, the sum is zero if there is no DC offset in the sampled waveform. Since there are always four samples separated equally in time across the waveform cycle, samples from the positive pulse G516 "cancel" samples from the negative pulse G518. If there is a constant DC offset through the waveform cycle, the sum of the four discrete time samples G500, G502, G504, and G506 will be equal to the amplitude of the DC offset.

FIG. 6 shows an example analog read signal when in tracking mode. The pulses in the user data occur randomly rather than in a predetermined pattern as in the acquisition waveform; the running average decimation method used for the acquisition waveform will not work when tracking arbitrary user data. The solution for tracking mode is to sum the samples of a first pulse with the samples of a second consecutive pulse to generate the DC offset. This requires a decision-directed decimation filter wherein the first and second pulses are detected by comparing their respective sample values to programmable thresholds.

Referring again to FIG. 4, the running average decimation filter for use in acquisition mode is implemented by a counter G414 and a sample accumulator G492. The decision-directed decimation filter for use in tracking mode is implemented by a decision-directing circuit G413 and the sample accumulator G492.

The sample accumulator G492 accumulates discrete time sample values received from line G108. Summing junction G418 adds the discrete time values applied to a first input over line G108 and the present accumulated sum applied to a second input over line G466. The accumulated sum is stored in accumulation register G424 and applied to line G466 as its output. Accumulation register G424 stores the value applied on line G470 whenever its CLK input is pulsed by the sampling clock 23. When multiplexor G420 passes the value on its input labelled 0, the output of summing junction G418 on line G468 is applied to line G470 as the new input value to accumulation register G424. In this manner, the value stored in accumulation register G424 is the sum of the previous discrete time sample values applied to line G108. When multiplexor G420 passes the value on its input labelled 1, the constant value zero on line G480 is applied to line G470 as the new input value to register G424. In this manner, the accumulated value stored in register G424 is reset to zero.

Multiplexor G420 passes its input labelled 0 when line G464 is low, and it passes its input labelled 1 when line G464 is high. When line G464 is high, the output of the summing circuit G418, which represents the DC offset, is passed through multiplexor G422 to a low pass filter G490 over line G472. Also, accumulation register G424 is reset to zero to begin a new accumulation period. Counter G414 controls line G464 during acquisition, and decision-directing circuit G413 controls line G464 during tracking as selected by multiplexor G416.

As discussed above with reference to FIG. 5A, a predetermined fixed number of samples are accumulated while the read channel is operating in acquisition mode. A one is applied to multiplexor G416 over line G415 when the read channel is operating in acquisition mode to pass the output of counter G414 over line G462. Counter G414 counts through a predetermined count value and sets line G462 high upon reaching terminal count. A microprocessor (not shown) configures the counter G414 through control line A to cycle through the predetermined count value. In the example 2T acquisition waveform of FIG. 5A, counter G414 is configured to cycle through four counts in order to accumulate four read signal sample values.

FIG. 5A depicts the output signal applied to the TC output G462 of counter G414. On every fourth sample clock 23 pulse, the TC signal applied to line G462 and line G464 through multiplexor G416 is set high for the duration of one sample clock 23 period. Setting line G464 high, as discussed above, causes the sampled value accumulation register G424 to reset to zero to begin a new accumulation period. At the same time, multiplexor G422 passes the output of summing circuit G418, which represents the DC offset, to low pass filter G490 over line G472. While line G464 is low, multiplexor G422 passes the constant value zero applied to its input labeled "0" over line G478 to its output on line G472. In other words, on every fourth sample clock 23 period the accumulated value of four discrete time samples, representing the DC offset, is applied to low pass filter G490 over line G472 for further processing and the accumulation register is reset to accumulate the next four sample values.

Figure 6A:
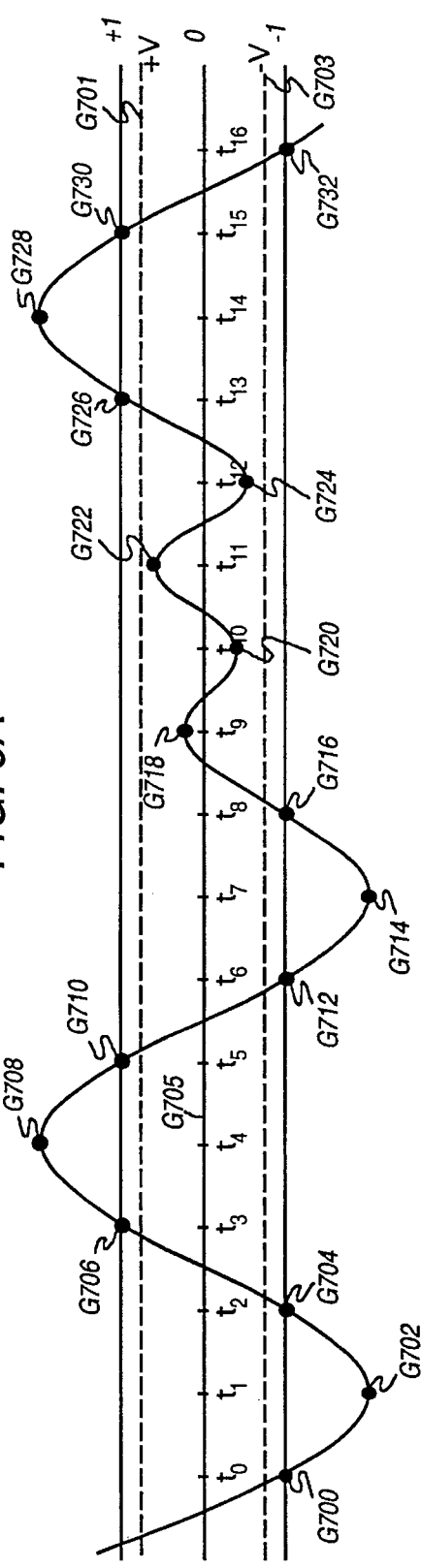
FIG. 6A and 6B show a sampled read signal and associated timing of DC offset control during tracking mode.

During tracking mode, the pulses representing user data occur randomly. Therefore, a variable number of samples are accumulated to detect the DC offset by summing the samples of a first pulse with the samples of a second consecutive pulse. FIG. 6A is a graph of an example read signal waveform in tracking mode. Consecutive positive pulses, such as G708 and G728, are separated by a negative pulse G714. In a perfectly equalized waveform, the sum of sample values G708 through G726 represents the DC offset in the waveform. Errors in the DC offset measurement are caused by asymmetries in the pulses, variations in the sampling frequency, and misequalized intersymbol interference appearing as residual pulse noise in samples G718, G720, G722, and G724.

Accumulation circuit G492 of FIG. 4 operates identical in tracking mode as in acquisition mode described above. Accumulation circuit G492 accumulates the discrete time samples received on line G108 starting with a first pulse on line G464 and ending with a second pulse on line G464. When the read channel switches from acquisition to tracking mode, line G415 is set low to select the output of decision-directing circuit G413 to control line G464.

In tracking mode, decision-directing circuit G413 determines the start and end of an accumulation period by detecting the occurrence of consecutive pulses. Two comparator circuits G402 and G400 shown in FIG. 4 detect positive and negative pulses, respectively. Positive comparator G402 detects when a discrete time sample value exceeds a positive threshold +V G701 indicating the presence of a positive pulse, and negative comparator G400 detects when a sample value exceeds a negative threshold −V G703 indicating a negative pulse. The thresholds are programmable and set by a microprocessor (not shown) over line A. The output of the comparators are set high if the current sample value applied over line G108 exceeds the respective positive or negative threshold, otherwise their outputs are low.

Inverter G406 inverts the output of positive comparator G402 on line G456 and applies the inverted signal to line G482 as a first input to AND gate G408. The output of OR gate G404 on line G454 is applied to a second input of AND gate G408. OR gate G404 receives a first input from the output of negative comparator G400 on line G450 and a second input from line G458 from the output of register G410. Register G410 receives the signal output generated by AND gate G408 and "latches" the value on its output line G458. AND gate G412 is connected to receive the output of register G410 and the output of positive comparator G402 wherein its output G460 controls line G464 through multiplexor G416.

The operation of the decision-directing circuit G413 can be understood by the following algorithmic description:

```
negative_pulse = positive_pulse = false
do forever
{
    wait for next sample Y (n)
    if (Y(n) > +V)
        positive_pulse = true
    else
        positive_pulse = false
    if(Y(n) < −V)
        negative_pulse = true
    if(positive_pulse && negative_pulse)
    {
        negative_pulse = false
        set line G460 and G464 high
    }
    else
        set line G460 and G464 low
}
```

As discussed above, accumulation circuit G492 of FIG. 4 accumulates the sample values applied over line G108 starting with a first pulse applied to line G464 and re-starting with the next pulse applied to line G464.

Figure 6B:
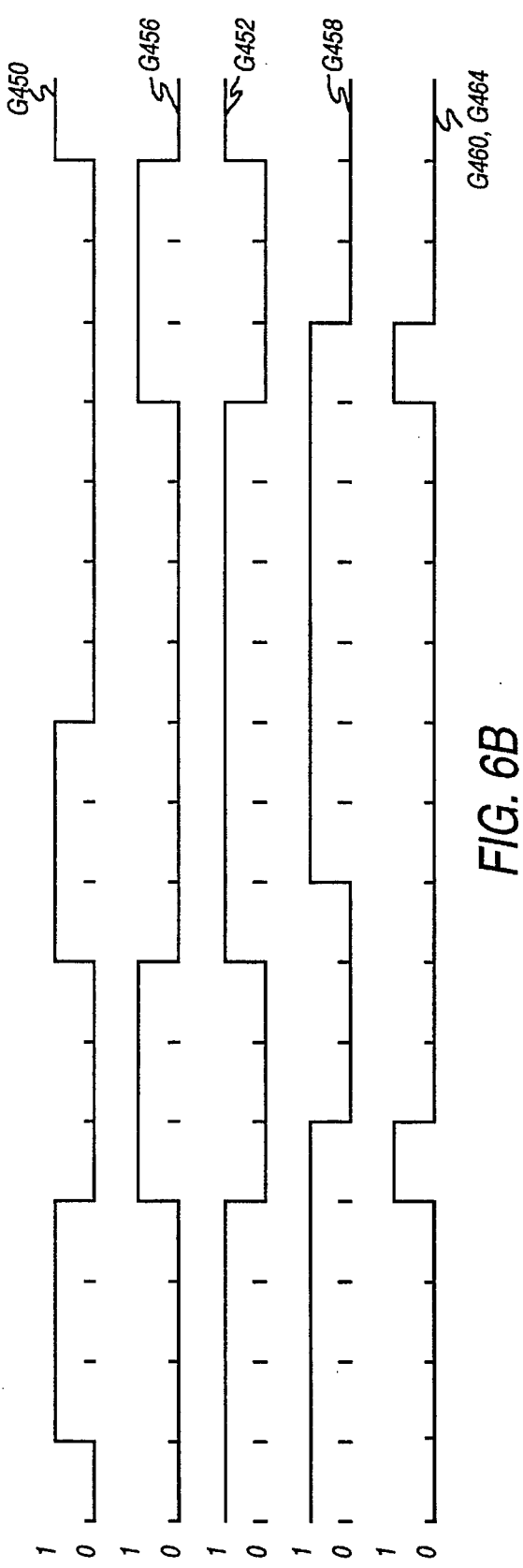

The operation of the decision-directing circuit G413 can also be understood with reference to the example tracking mode waveform shown in FIG. 6A and associated timing waveforms shown in FIG. 6B. Assuming the output of register G410 is initially high, sample value G706 exceeds the positive threshold +V G701 setting line G456 high, the output of AND gate G408 low, and the output G460 of AND gate G412 high causing the accumulation circuit G492 to reset. At the next sample clock 23, the output G458 of register G410 is set low, and accumulation circuit G492 begins accumulating sample values. Sample value G712 exceeds the negative threshold −V G703 setting line G450, G482, G454, and G452 high. On the next sample clock 23, the high on line G452 is latched into register G410 and applied to its output G458. The input of register G410 is kept high by feeding back the output G458 through OR gate G404 and AND gate G408. Again, accumulation circuit G492 continues to accumulate each sample value. Sample value G726 exceeds the positive threshold G701 setting line G460 and G464 high. As described above, when line G464 is high, the summed samples G708 through G726, representing the DC offset, are transmitted from summing circuit G418 through multiplexor G422 to low pass filter G490 over line G472, and accumulation circuit G492 is reset. The accumulation processes is then started again.

Low pass filter G490 receives the discrete time DC offset values over line G472. The DC offset values are applied to a gain K G426 and then integrated through summing circuit G428 and register G430. A microprocessor programs the value for the gain K G426 over line A. The microprocessor or channel quality circuit can also read the integrated DC offset value from register G430 over line A. The transfer function for low pass filter G490 is simply K/(1−D) which attenuates noise in the DC offset measurement. The output of low pass filter G490 is applied over line G431 to a discrete time to analog converter G432 to convert the discrete time DC offset signal to an analog DC offset signal G104. The analog DC offset signal is applied over line G104 and subtracted from analog read signal Y(t) 11 through summing circuit G102 as shown in FIG. 3.

Although the present invention has been described in relation to a polarity symmetric analog read signal, the DC offset controller G100 can also be used to adjust the DC offset in a polarity asymmetric analog read signal, such as the read signal generated by a magneto resistive (MR) read head. The operation of the DC offset controller G100 when processing asymmetric pulses can be understood with reference to FIG. 7.

Figure 7:
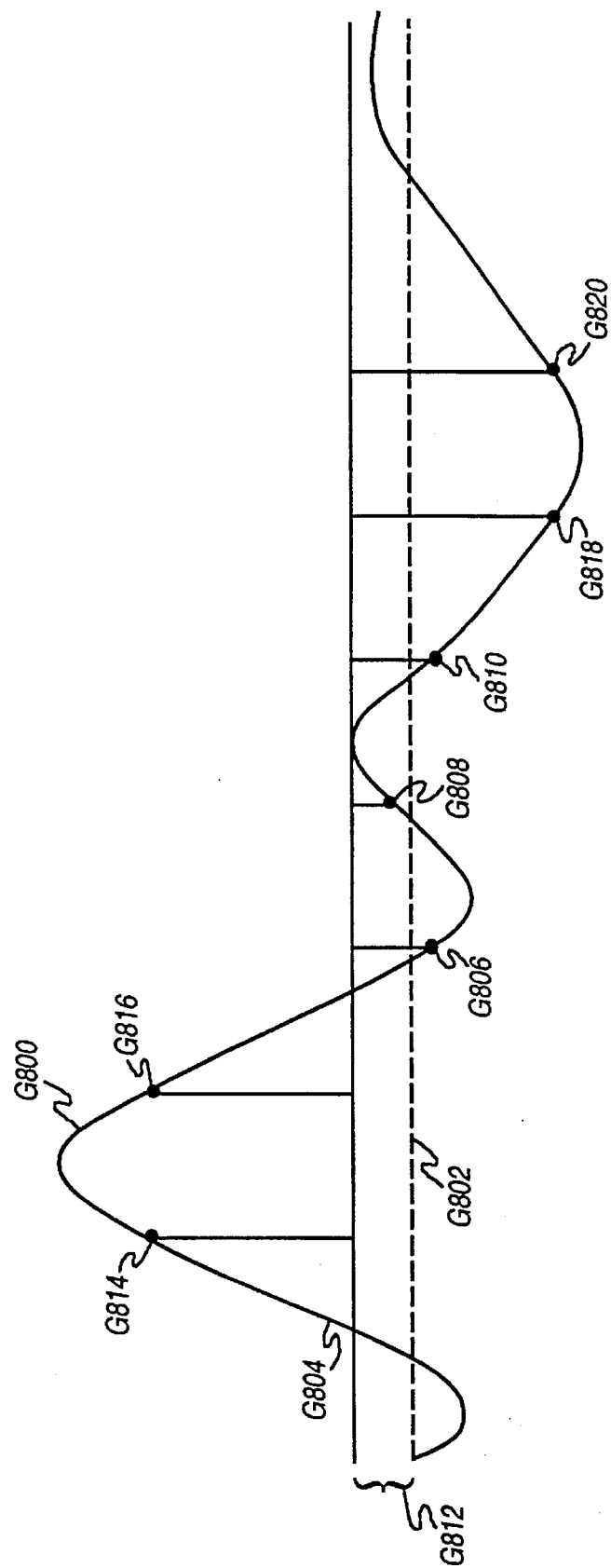
FIG. 7 shows a sampled read signal having asymmetric positive and negative pulses and an associated offset added to the analog read signal to compensate for the asymmetry.

FIG. 7 shows an analog read signal G800 having asymmetric positive and negative pulses. The dashed line G802 represents the average or DC offset of the analog read signal G800, and the solid line G804 represents the average or DC offset for the sample values of the positive and negative pulse ({G814, G816}) and ({G818, G810}). The sample values G806, G808, and G810, are caused by intersymbol interference. If the average of these intersymbol interference samples is equal to the average of the sample values of the positive and negative pulses (solid line G804), then the DC offset controller G100 would adjust the analog signal so that the sample values of the positive pulse {G814, G816} match, in magnitude, the sample values of the negative pulse {G818,G820}. That is, the DC offset controller G100 would adjust the DC offset in the analog read signal G800 by a small amount G812 so that the average value of the positive and negative pulse sample values would be at solid line G804.

Because the average of intersymbol interference samples G806, G808, and G810 is not actually equal to the average of the sample values of the positive and negative pulses (solid line G804), the DC offset G812 added to the analog read signal G800 will be slightly different causing a small difference in the average of the positive and negative pulse samples. That is, the magnitude of the positive and negative pulse samples will not be symmetric which may cause detection errors in the sequence detector 34. Adding a DC offset correction value G103 at adder G105 of FIG. 3 compensates for the effect of intersymbol interference. In this manner, the DC offset controller of the present invention adjusts the analog read signal so that the magnitude of the positive and negative pulse samples are more symmetric as desired.

The objects of the invention have been fully realized through the embodiment disclosed herein. Those skilled in the art will appreciate that the aspects of the invention can be achieved through various embodiments without departing from the spirit and scope of the invention. The particular embodiment disclosed is illustrative and not meant to limit the scope of the invention as appropriately construed by the following claims.

TABLE 1

| Channel | Transfer Function | Dipulse Response |
|---------|-------------------|------------------|
| PR4     | $(1-D)(1+D)$      | 0, 1, 0, −1, 0, 0, 0, ... |
| EPR4    | $(1-D)(1+D)^2$    | 0, 1, 1, −1, −1, 0, 0, ... |
| EEPR4   | $(1-D)(1+D)^3$    | 0, 1, 2, 0, −2, −1, 0, ... |

We claim:

1. A sampled amplitude read channel for reading digital data from a magnetic medium by detecting the digital data from a sequence of discrete time sample values generated by sampling pulses of alternating polarity in an analog read signal from a magnetic read head positioned over the magnetic medium, said sampled amplitude read channel comprising:

(a) a sampling device for sampling the analog read signal to generate the discrete time sample values;

(b) a decimation DC offset controller, responsive to the discrete time sample values, for adjusting a DC offset in the analog read signal; and (c) a discrete time sequence detector, responsive to the discrete time sample values, for detecting the digital data.

2. The sampled amplitude read channel of claim 1, wherein the DC offset control comprises at least one discrete time decimation filter, responsive to the discrete time sample values, for detecting and passing the DC offset in the discrete time sample values.

3. The sampled amplitude read channel of claim 2, wherein the discrete time decimation filter adds a first plurality of discrete time sample values of a positive pulse to a second plurality of discrete time sample values of a negative pulse.

4. The sampled amplitude read channel of claim 2, further comprising:

(a) a discrete time to analog converter, responsive to the DC offset detected, for converting the DC offset detected into an analog DC offset signal; and (b) an analog adder, responsive to the analog DC offset signal and the analog read signal, for subtracting the analog DC offset signal from the analog read signal.

5. The sampled amplitude read channel of claim 2, further comprising a discrete time equalizing filter responsive to the discrete time sample values, wherein:

(a) the read channel operates in an acquisition mode and a tracking mode;

(b) the at least one decimation filter is responsive to the discrete time sample values at an input to the discrete time equalizing filter during acquisition mode; and (c) the at least one decimation filter is responsive to the discrete time sample values at an output of the discrete time equalizing filter during tracking mode.

6. The sampled amplitude read channel of claim 2, wherein:

(a) the read channel operates in an acquisition mode and a tracking mode;

(b) the at least one decimation filter comprises a first decimation filter and a second decimation filter; and (c) the first decimation filter is enabled when the read channel is in acquisition mode, and the second decimation filter is active during tracking mode.

7. The sampled amplitude read channel of claim 6, wherein the first decimation filter is a running average decimation filter.

8. The sampled amplitude read channel of claim 7, wherein the running average decimation filter adds a predetermined number of discrete time sample values.

9. The sampled amplitude read channel of claim 6, wherein the second decimation filter is a decision-directed decimation filter.

10. The sampled amplitude read channel of claim 9, wherein the decision-directed decimation filter adds a variable number of discrete time sample values relative to a detection of a first pulse and a consecutive second pulse.

11. The sampled amplitude read channel of claim 10, wherein:

(a) the decision-directed decimation filter comprises a threshold; and (b) a pulse is detected when the discrete time sample values exceed the threshold.

12. A sampled amplitude read channel for reading digital data from a magnetic medium by detecting the digital data from a sequence of discrete time sample values generated by sampling pulses of alternating polarity in an analog read signal from a magnetic read head positioned over the magnetic medium, said sampled amplitude read channel comprising:

(a) an analog adding circuit comprising a positive input connected to receive the analog signal; a negative input connected to receive an analog DC offset signal; and an analog output;

(b) a sampling device, connected to receive the analog output from the analog adding circuit, for generating the discrete time sample values;

(c) a decimation filter connected to receive the discrete time sample values, for generating a discrete time DC offset signal;

(d) a discrete time to analog converter, connected to receive the discrete time DC offset signal, for generating the analog DC offset signal; and (e) a discrete time sequence detector responsive to the discrete time sample values for detecting the digital data.

13. A sampled amplitude read channel for reading digital data from a magnetic medium by detecting the digital data from a sequence of discrete time sample values generated by sampling pulses of alternating polarity in an analog read signal from a magnetic read head positioned over the magnetic medium, said sampled amplitude read channel comprising:

(a) a sampling device for sampling the analog read signal to generate the discrete time sample values;

(b) a discrete time adder, responsive to the discrete time sample values, for adding a predetermined discrete time DC offset to the discrete time sample values to generate a sequence of DC offset discrete time sample values in order to compensate for asymmetries between positive and negative pulses in the read signal;

(c) a DC offset controller, responsive to the DC offset discrete time sample values, for adjusting a DC offset in the analog read signal; and (d) a discrete time sequence detector, responsive to the discrete time sample values, for detecting the digital data.

14. A sampled amplitude read channel for reading digital data from a magnetic medium by detecting the digital data from a sequence of discrete time sample values generated by sampling pulses of alternating polarity in an analog read signal from a magnetic read head positioned over the magnetic medium, said sampled amplitude read channel comprising:

(a) a sampling device for sampling the analog read signal to generate the discrete time sample values;

(b) a DC offset controller, responsive to the discrete time sample values, for generating a computed DC offset in the analog read signal;

(c) a discrete time adder for adding a predetermined constant DC offset to the computed DC offset in order to compensate for asymmetries between positive and negative pulses in the read signal; and (d) a discrete time sequence detector, responsive to the discrete time sample values, for detecting the digital data.

* * * * *

UNITED STATES PATENT AND TRADEMARK OFFICE
CERTIFICATE OF CORRECTION

PATENT NO. : 5,583,706
DATED : December 10, 1996
INVENTOR(S) : Dudley, et al

It is certified that error appears in the above-indentified patent and that said Letters Patent is hereby corrected as shown below:

On the title page, under Inventors, inventor "William G. Gliss" should read --William G. Bliss--; and inventor "Richard T. Behems" should read --Richard T. Behrens--. On col. 1, line 12, the phrase "08/01,266 entitled" should read --08/012,266 entitled--. On col. 1, line 30, the phrase "computers, and particularly" should read --computers, particularly--. On col. 14, lines 54 to 55, the phrase "detector responsive to the discrete time sample values for" should read --detector, responsive to the discrete time sample values, for--.

Signed and Sealed this

Twenty-fourth Day of June, 1997

*Attest:*

*Attesting Officer*

BRUCE LEHMAN

*Commissioner of Patents and Trademarks*